Figure 1:
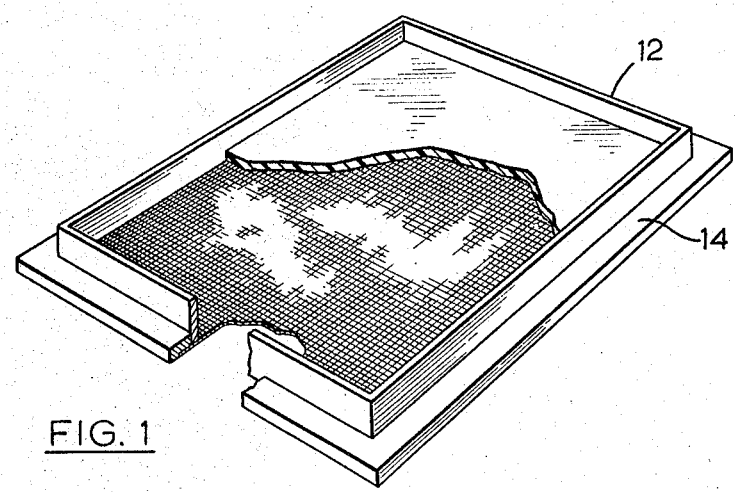

Aug. 9, 1966   A. E. MacGUIRE   3,265,858
HEATING PANEL

Filed Nov. 4, 1963   3 Sheets-Sheet 1

*INVENTOR.*
ANDREW E. MacGUIRE
BY
*R. L. Westell*
AGENT FOR THE APPLICANT

Aug. 9, 1966          A. E. MacGUIRE          3,265,858
                         HEATING PANEL

Filed Nov. 4, 1963                          3 Sheets-Sheet 2

INVENTOR
ANDREW E. MacGUIRE
BY~ R L Westell
AGENT FOR THE APPLICANT

Aug. 9, 1966  A. E. MacGUIRE  3,265,858
HEATING PANEL

Filed Nov. 4, 1963  3 Sheets-Sheet 3

INVENTOR.
ANDREW E. MacGUIRE
BY
*R L Westell*
AGENT FOR THE APPLICANT

3,265,858
HEATING PANEL
Andrew E. MacGuire, Toronto, Ontario, Canada, assignor of one-third each to Horace Roby, Port Credit, Peter Stewart, Downsview, and J. Arthur Male, Bramalea, Ontario, Canada
Filed Nov. 4, 1963, Ser. No. 321,716
7 Claims. (Cl. 219—345)

This invention relates to an electric heating panel and to a method of making an electric heating panel.

This application is a continuation-in-part of my application Serial No. 844,296, filed October 5, 1959, now abandoned.

Electric heating panels are commonly used in many heating applications. This invention relates to an electric heating panel utilizing a thermosetting resin having desirable heat storage properties that can be manufactured economically without costly curing moulds for the resinous body thereof.

By "chemically inert" herein, I mean chemically inert as far as the resin used is concerned.

By "homogeneous" herein in relation to two joined plastic bodies, I mean forming a unitary body "of the same character and quality throughout" and further that the term is used to distinguish the state herein called "homogeneous" from the state where two bodies joined together are essentially an adherent lamination of two bodies.

The panel generally comprises a body of material having an electrically conducting wire embedded therein, which includes a chemically inert filler held together by a thermosetting plastic which has been formed in an unique manner.

The invention provides that two bodies of thermosetting plastic in uncured form and having complementary areas shall be placed on either side of an electric heating element which is designed so that after placing, such complementary areas may substantially contact one another. Heat, and pressure which tends to move the two bodies toward one another is applied in a degree to substantially simultaneously cure the plastic in the two bodies and to cause them to form a single homogeneous body. Thus the electric heating element is embedded in the homogeneous body as if moulded therein but without the expense and equipment required for moulding.

In order to make the panel according to this invention, the filler, a water soluble polymerizable resin and a plasticizer therefor are mixed in water as a cold slurry to which is added an accelerator (sometimes known as a hardener) for the resin. The slurry is then at least partially dehydrated in a forming tray. Following this the cake formed from the slurry is further dried. The presence of the accelerator aids in the dehydration of the cake and in the formation of a surface therein which although it should not be termed "tough" is tougher and more resistant to damage than the interior of the cake.

A heating panel is then formed by placing an electrical conductor between the boundaries of two or more of such sheets or cakes placed flatwise against one another. The sheets or cakes thus laminated are subjected to heat and pressure which has the effect with the materials used of both curing the resin and transforming the laminated sheets into a single homogeneous sheet, around about and between the electrical conductor, wherein the boundaries between the surfaces of adjacent sheets no longer exist and a single homogenous body is formed. The method is especially advantageous because it does not require the provision of an expensive moulding die in which to set the panel.

In the matter of placing electrical conductors between two cakes or two sheets, one method of doing this is by placing a heating element in one, or another, desired form between two cakes and forming them into a homogeneous unit by heat and pressure. Alternatively the electrical conductor may be wound about one of the cakes which is then placed between two other cakes and the three cakes formed into a homogeneous unit by heat and pressure. In this connection, it will be noted that if areas of foreign material of any kind are, in any form of the invention, used to support the electrical heating element during its application to the panel, and if such material is left between the cakes, then apertures must be provided and/or inset margins of the material relative to the boundaries of the cakes, must be provided, whereby there are substantial contacting areas of adjacent cakes to achieve their homogeneous connection under the application of heat and pressure.

The invention will be clearly understood after reference to the following detailed specification read in conjunction with the drawings.

Figure 3:
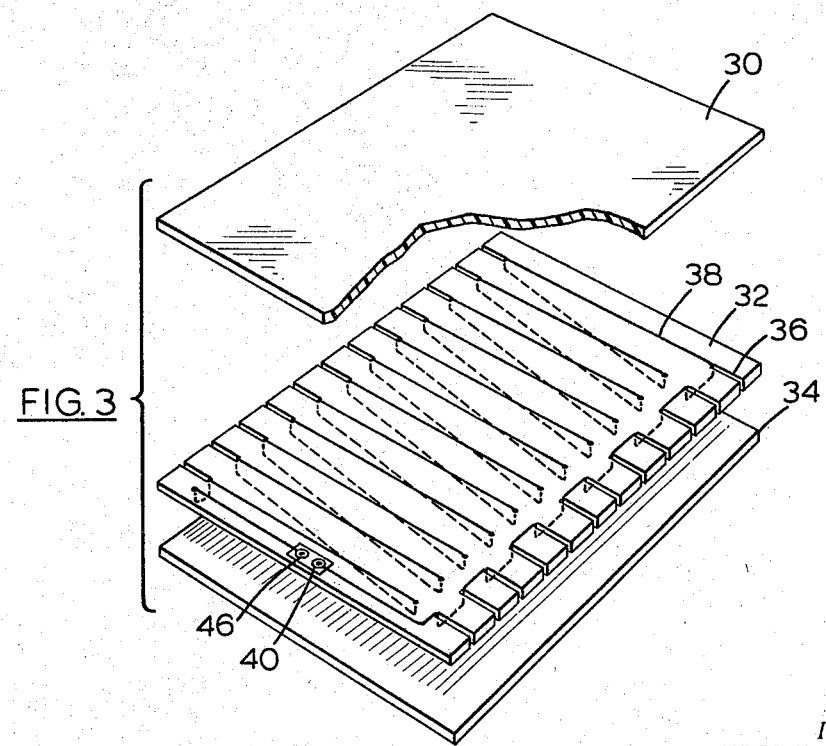
Figure 2:
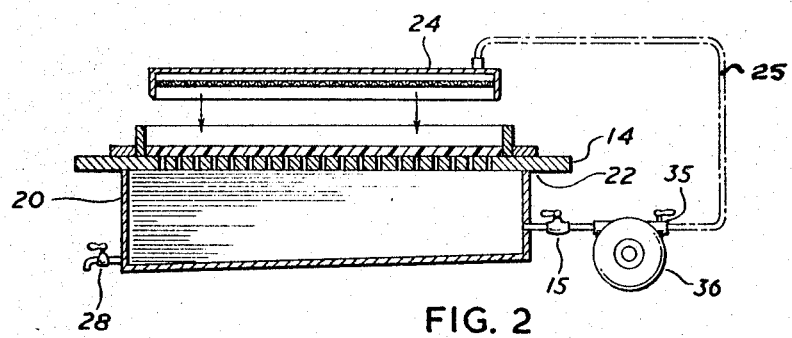
Figure 6:
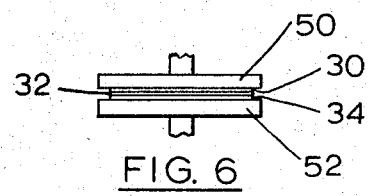
Figure 4:
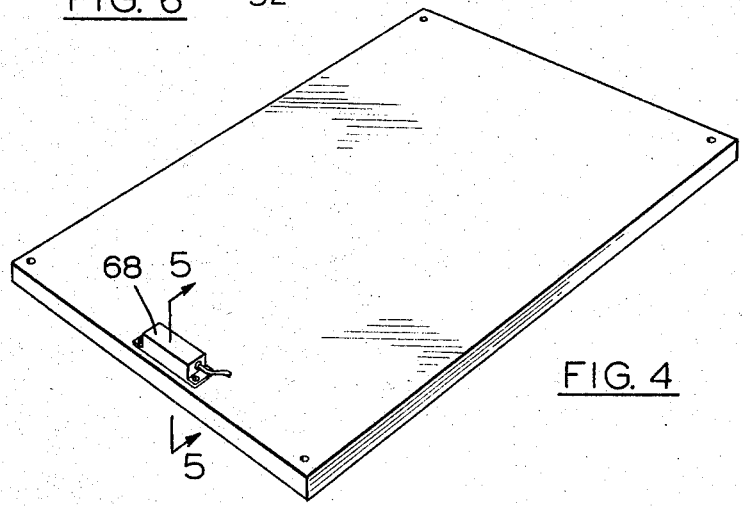
Figure 5:
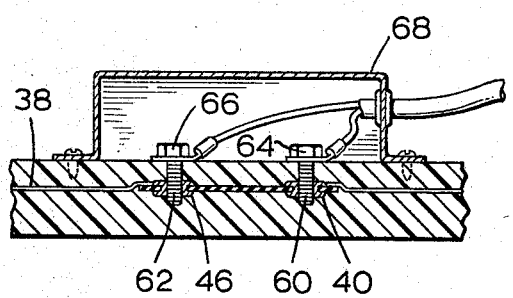

In the drawings:
FIGURE 1 is a view of the slurry tray.
FIGURE 2 is a view of the vacuum drying machine.
FIGURE 3 is a view of three preformed sheets, one of them being wound with an electrical resistance.
FIGURE 4 shows the three sheets of FIGURE 2 laminated and being cured between the plattens of a heated press, and
FIGURE 5 shows a completed heating panel,
FIGURE 6 shows a sectional view through the panel at the line 5—5.

As indicated above, the first step in making an electric heating panel according to my invention is the mixing of a slurry, the principal ingredients of which are a water soluble polymerizable resin, a filler, and a plasticizer and an accelerator for the resin. The resin in its uncured state and the filler are preferably dry mixed. To the dry mixture, I add water and a plasticizer and lastly the accelerator. The reason for adding the accelerator last is it has a tendency after addition to begin reaction with other elements of the mixture and hence the mixture must soon be used once the accelerator is added. The accelerator may be any one of a number well known to those skilled in the art for use with the thermosetting resin used. Examples of such accelerators are aluminum sulphate, alum, calcium chloride, potassium sulphide and sodium carbonate.

The resin is a thermosetting, water soluble powdered resin in its uncured state preferably of the phenolic type such as, phenol formaldehyde. The resin can be of the one stage or the two stage curing type but must be water soluble.

The filler employed will depend upon the availability of materials and the end characteristics required in the heating panel. I have found, however, that a filler comprising 55–70% by weight of silica flour and/or powdered slate, on the one hand, and 45–30% by weight of asbestos or fiberglass fibres on the other hand, is suitable for my purposes. It will be realized that for high temperature applications, more silica flour and less powdered slate may be used while asbestos rather than fiberglass fibres may be used.

A filler within the above limits results in an end product that has very desirable heat storing properties. The silica powder is chosen for its low moisture absorbing qualities and low heat conductivity. The slate powder has low heat conductivity, provides hardness in the product, and is desirable from the point of view of storing heat in the panel in use. The asbestos has the quality of being able to bind the product together and give it a good tensile and impact strength and resistance to heat.

The panel in general has the advantage that being a poor conductor of heat, it feels cooler than panels of better thermal conductivity, at the same actual temperature, and thus the risk of burning, by the panels, of bodies in contact therewith, is less with applicant's panels than with higher conductivity panels at the same temperature.

Other fillers which could be used in applicant's panels are: fly ash, mica powder, ground kraft fibres, and the fillers mentioned two paragraphs previously in various or differing proportions.

The plasticizer is added to the mix for the purpose of creating a good resin flow during the subsequent heat and pressure stage. The choice of a plasticizer for a particular water soluble polymerizable resin is a matter of choice and skill in the art. I have however successfully employed zinc stearate and furfural while barium hydroxide and barium stearate could be used although more expensive than the first two plasticizers mentioned.

The mixture may be coloured black in one of a number of ways. This increases the thermal efficiency of the product in its function as a heating panel, and this has been found to be true even where the radiating surface of the black panel has been covered with a surface of another colour for aesthetic reasons. Such black colouring may be achieved for example by adding to the mixture a black lake dye or black microsine dye.

It will be appreciated that variation in the amount and content of the mix is possible, where desirable. For example for lower temperature use craft fibres may be used in the filler instead of asbestos to produce a product which is not as temperature resistant but which is more easily worked. Fly ash, which is a residue from coal burned in electric power stations, can be used instead of silica flour in the filler.

The mix when completed is poured into a forming tray which has a foraminous or screened bottom through which water may be drawn off under vacuum. Some loss of materials will ensue when the vacuum is applied and hence the guage of the bottom apertures should be somewhat less than that of the filler. For example with a filler where, for example, the slate or silica flour is 30 guage the apertures should be about 35 guage.

During drying, by means of the application of vacuum to the underside of the tray, after the easily extracted water has been drawn off, a cover which forms a resistance to the air is placed over the tray. Such cover is pulled downward onto the cake formed from the slurry while the vacuum is being applied, tending to maintain the cake level and maintaining the area of the tray filled, in plan view while the volume of the cake is being diminished by the removal of moisture.

In the preferred embodiment, the top cover is also foraminous and defines the lower wall of a chamber connected to a vacuum pump. In this way when the vacuum drying (through the tray bottom) has been completed, and the vacuum turned off, a vacuum may be applied through the top cover, causing the cake to adhere to the top cover, whereby it may be lifted intact with and by means of the cover to remove the cake from the tray. This is considered a substantial advance over prior art methods of handling such a cake which tended to cause breakage and cracking.

Following initial drying, the cake formed from the slurry is removed from the tray and stacked so that air has access thereto for further drying. Drying continues until the moisture content is in the order of under 5% and preferably 2% by weight of the cake. In connection with the drying, the temperature should be maintained low enough that pre-curing of the resin content of the panels will not take place. For most phenolic resins this means drying in a temperature of below 70°–75° centigrade.

The drying process is an air drying process so that drying may take place slowly whereby undue warping may be avoided.

In FIGURE 1 of the drawings there is illustrated a forming tray. It comprises a frame 12 having a depth of about 1½" seated on a larger frame 14 having a wire mesh bottom. As already stated the mesh of the bottom should be somewhat smaller than the slate or silica being used.

In use a slurry is mixed as described above, with the accelerator added last, and poured into the frame 12 of the forming tray. Excess moisture drops through the apertures of the mesh of the frame 14 and additional moisture is drawn off through frame 14 by means of a vacuum machine, with the valve 15 open to cause the application of vacuum to the bottom.

The vacuum machine illustrated in FIGURE 2 comprises a body 20 having a seat 22 for the slurry tray and a cover 24 to be described hereafter for sealing the top thereof after the tray has been seated. Vacuum is applied to the chamber on the underside of the tray by means of the vacuum pump generally indicated by the numeral 26.

The cover 24 is designed to initially sit in spaced relation to and above the tray 12. On application of the vacuum by opening valve 15 a substantial amount of moisture is drawn out of the slurry. Then the lid 24 is applied to the top of the slurry with the vacuum still applied and the lid 24 is sucked down over the slurry within the tray that is mounted within the seat 22 whereby to squeeze water from the slurry within the tray and to give an even surface to the slurry within the tray and to form a cake therefrom. Water drained from the slurry within the tray is drained out of the body 20 of the vacuum machine through the outlet 28.

The cover 24 is foraminous and forms the bottom of a chamber also defined and enclosed by side and top walls, with the chamber connected by conduit 25 through a valve 35 to the vacuum pump 36.

When the vacuum drying through chamber bottom 14 has been completed, the vacuum is turned off through valve 15 and the bottom vacuum released by means not shown, or by opening valve 28. Valve 35 is then opened so that the vacuum pump may apply vacuum through conduit 25 and the cake is then caused by the upwardly applied vacuum through the apertures in cover 24 to adhere to the latter. The cover 24 is then raised to lift the cake to which it is attached by vacuum suction, out of the tray.

A series of preformed cakes are thus formed and dryed at a temperature below 70° centigrade, and at a relatively slow rate. The 70° limit is governed by the tendency of the resins within the slurry to react. It normally takes 3 to 7 days (usually 3 to 4 days) to slowly dry the sheets to a point where their moisture content is sufficiently low for the steps which follow. I have found that the moisture content should be below 5% and preferably 2% by weight of the cake.

Following drying, in the preferred embodiment, three cakes are taken for the formation of a composite heating panel. I have indicated three such cakes by the numerals 30, 32 and 34 in FIGURE 3 of the drawings. The middle cake 32 is slit along opposed edges as at 36 and an electrically conducting resistance wire 38 is wound thereon. The wire 38 is electrically connected at one free end to a button contact 40 from which it extends along an edge of the panel 32 passing through each of the slits 36 as indicated. It is then wound around the panel between the slits 36 at opposed edges of the cake as indicated. Its other free end is connected to an electrically conducting button 46.

The electricity conducting buttons 40 and 46 are mounted upon a piece of mica or asbestos and are spaced from each other for electrical insulation.

After the panel 32 has been wound with an electricity conducting wire as indicated above, it is disposed between the panels 30 and 34 and the three panels are together mounted between the platens 50 and 52 of a press for curing. The platens 50 and 52 are heated to 150°–160° centigrade, so that as pressure is applied, the resins within the panels 30, 32 and 34 polymerize and substantially at the same time form the three panels into a homogeneous mass with the electricity conducting element embedded therein. One of the advantages of my invention is that during the application of heat and pressure there is comparatively little horizontal flow.

In a suitable product I have made, prior to curing between the platens of the press 50 and 52, the three cakes have a thickness of about ¼ of an inch. Following curing between the platens of the press they are reduced to about ⅛ of an inch, that is, the total thickness of the final product is about ⅜ of an inch.

Following removal from the platens of the press the composite panel is cooled slowly in order not to unduly stress the unit.

Following cooling, the edges of the unit are trimmed to achieve the desired dimensions. After trimming, one face of the composite panel is drilled as at 60 and 62 to provide access to the electrically conducting buttons 40 and 46. Bolts or screws 64 and 66 (as desired) enter the holes so formed and threadedly engage with the buttons 40 and 46, so that the unit can be electrically connected to a power source as indicated. A cover 68 for the bolts is preferably provided. The unit can be conveniently drilled for mounting as required in use.

Modification in the method of making the panel and in the panel are, of course, possible within the scope of the invention, for example, I have also found it satisfactory to substitute a thin sheet of asbestos or similar sheet for the middle cake 38. Asbestos has the advantage of being more rugged during the winding operation. The asbestos sheet is laminated between the two plastic sheets as before. However, where this is done, openings of substantial area are left in the substitute middle sheet which is also inset from the cakes at all margins. The purpose of such openings and insets and of making the middle sheet thin is so that the two outer cakes will meet under the heat and pressure applied, and form together into a unitary homogeneous body at or about the time of curing between and about the conductor and the middle sheet.

The description heretofore has dealt with the resin as if it were a one-stage resin. The procedure with a two stage resin would be substantially the same as described above with the final curing being performed as two cakes are pressed together with the application of heat, about an electrical conductor. The only difference which could occur with a two stage resin is that the initial curing or pre-curing could be performed between the formation of the dried plate and the heat and pressure step. However it is not often a two stage resin would be used in this way with the inventive method, since in this application, if a two stage resin is used, there is little advantage in curing such resin in two stages.

What is claimed is:

1. An electric heating panel comprising an electric conductor fixed within a homogeneous unitary body of a water soluble thermosetting polymerizable resin having an inert filler.

2. A method of constructing an electric heating panel comprising: taking at least two cakes comprising a homogenous mixture of an uncured water soluble thermosetting polymerizable resin, a plasticizer therefor, an accelerator therefor and a chemically inert filler, then placing an electric heating element between at least two adjacent ones of such cakes in such a way that said adjacent cakes may contact one another over substantial areas, and applying heat and pressure tending to force said cakes together until said cakes join to form a unitary body.

3. A method of making an electric heating panel comprising: placing an electric heating element between two cakes of a homogeneous mixture of an uncured thermosetting polymerizable resin, a plasticizer therefor, and a chemically inert filler, and applying heat and pressure to said two cakes tending to move said cakes toward one another until said cakes form a homogeneous, unitary body.

4. A method as claimed in claim 3 wherein said mixture contains an accelerator for said resin.

5. A cake for the formation of an electric heating panel comprising a homogeneous mixture of an uncured, water soluble thermosetting polymerizable resin, a plasticizer therefor, an accelerator therefor and a chemically inert filler and moisture in the amount of less than 5%.

6. A heating panel comprising at least two cakes of the type defined in claim 5 having an electric heating element between them and pressed together with the application of heat and pressure sufficient to substantially simultaneously cure said cakes and to cause them to form a single homogeneous body.

7. A method of making a heating panel comprising: taking a pair of cakes as defined in claim 5 and placing them on either side of an electric heating element and pressing said cakes together about said heating element with the application of sufficient heat and pressure to cause said cakes to form a homogeneous unitary body.

References Cited by the Examiner

UNITED STATES PATENTS

| | | | |
|---|---|---|---|
| 1,959,433 | 4/1934 | Loetscher | 260—17.2 |
| 2,111,418 | 3/1938 | Buxbaum | 264—71 |
| 2,297,504 | 9/1942 | Salvaneschi | 264—71 |
| 2,441,860 | 5/1948 | Whetstone | 260—57 |
| 2,526,427 | 10/1950 | Simon | 260—38 |
| 2,623,150 | 12/1952 | Boecher et al. | 219—213 |
| 2,834,862 | 5/1958 | Meyers | 219—345 |
| 2,889,439 | 6/1959 | Musgrave | 219—345 |
| 3,001,054 | 9/1961 | Fehner | 219—345 |

RICHARD M. WOOD, *Primary Examiner.*

C. L. ALBRITTON, *Assistant Examiner.*